US010694222B2

(12) United States Patent
Agarwal et al.

(10) Patent No.: US 10,694,222 B2
(45) Date of Patent: Jun. 23, 2020

(54) GENERATING VIDEO CONTENT ITEMS USING OBJECT ASSETS

(71) Applicant: Microsoft Technology Licensing, LLC, Redmond, WA (US)

(72) Inventors: Mukesh Agarwal, Bangalore (IN); Murali Krishna Guggilam, Bangalore (IN); Janani Varadharajan, Bangalore (IN); Chirag Vaitheeswaran, Bangalore (IN); Vikram Bodavula, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 29 days.

(21) Appl. No.: 14/989,922

(22) Filed: Jan. 7, 2016

(65) Prior Publication Data

US 2017/0201777 A1 Jul. 13, 2017

(51) Int. Cl.
| | |
|---|---|
| *H04N 21/234* | (2011.01) |
| *H04N 21/61* | (2011.01) |
| *H04N 21/81* | (2011.01) |
| *G06K 9/00* | (2006.01) |
| *H04N 5/265* | (2006.01) |
| *G06T 13/00* | (2011.01) |

(Continued)

(52) U.S. Cl.
CPC ... *H04N 21/23412* (2013.01); *G06K 9/00718* (2013.01); *G06Q 30/02* (2013.01); *G06Q 30/0278* (2013.01); *G06Q 30/0643* (2013.01); *G06T 13/00* (2013.01); *H04N 5/265* (2013.01); *H04N 21/6125* (2013.01); *H04N 21/8166* (2013.01)

(58) Field of Classification Search
CPC ......... H04N 21/23412; H04N 21/6125; H04N 5/265; H04N 21/8166; G06T 13/00; G06K 9/00718; G06Q 30/0278; G06Q 30/0643; G06Q 30/02
See application file for complete search history.

(56) References Cited

U.S. PATENT DOCUMENTS 8,386,317 B2   2/2013   Brown et al.
8,695,031 B2   4/2014   Kumar et al.
(Continued)

FOREIGN PATENT DOCUMENTS

CN   104288992 A   1/2015

OTHER PUBLICATIONS

"About Mobile App Installs Campaigns", Retrieved on: Oct. 30, 2015, Available at: https://support.google.com/adwords/answer/6032059?hl=en.

(Continued)

*Primary Examiner* — Junior O Mendoza
*Assistant Examiner* — Aklil M Tesfaye
(74) *Attorney, Agent, or Firm* — Holzer Patel Drennan

(57) ABSTRACT

Video content items are automatically, or with some user input, created for objects based on assets associated with the objects. Where the object is an application, the assets may include images of the application, footage of a user using the application, and textual descriptions or reviews of the application. The assets are arranged using templates that specify audio content to use during the video content item, as well as animations to use during the video content item. A generated video content item can be distributed with the object, or may be used to promote the object.

12 Claims, 10 Drawing Sheets

(51) Int. Cl.
*G06Q 30/02* (2012.01)
*G06Q 30/06* (2012.01)

(56) References Cited

U.S. PATENT DOCUMENTS

| | | | |
|---|---|---|---|
| 8,813,120 | B1 | 8/2014 | Kosslyn |
| 8,957,915 | B1 | 2/2015 | Chalasani et al. |
| 9,002,175 | B1 | 4/2015 | Raj |
| 9,454,531 | B1* | 9/2016 | Fisher .................. G06F 16/44 |
| 10,057,651 | B1* | 8/2018 | Singh ................ H04N 21/4394 |
| 2009/0119717 | A1* | 5/2009 | Newton ............ G06F 17/30796 |
| | | | 725/59 |
| 2010/0023863 | A1* | 1/2010 | Cohen-Martin ....... G06Q 30/02 |
| | | | 715/723 |
| 2010/0070057 | A1 | 3/2010 | Sugiyama |
| 2011/0078726 | A1* | 3/2011 | Rosenberg ............ G06Q 30/02 |
| | | | 725/34 |
| 2011/0125838 | A1 | 5/2011 | Rao |
| 2013/0074139 | A1* | 3/2013 | Cope .................... H04N 9/8205 |
| | | | 725/114 |
| 2013/0086277 | A1 | 4/2013 | Sumler et al. |
| 2013/0195429 | A1 | 8/2013 | Fay et al. |
| 2013/0343727 | A1* | 12/2013 | Rav-Acha ............ G11B 27/031 |
| | | | 386/282 |
| 2014/0245463 | A1 | 8/2014 | Suryanarayanan et al. |
| 2014/0317480 | A1 | 10/2014 | Chau et al. |
| 2015/0143413 | A1 | 5/2015 | Hall et al. |
| 2015/0194146 | A1* | 7/2015 | Wu ........................ G06F 17/22 |
| | | | 386/285 |
| 2016/0105708 | A1* | 4/2016 | Packard ........... H04N 21/23439 |
| | | | 725/10 |
| 2016/0188702 | A1* | 6/2016 | Lee-Goldman ..... G06F 17/3064 |
| | | | 707/749 |
| 2017/0164021 | A1* | 6/2017 | Imbruce ............... G11B 27/034 |
| 2017/0169853 | A1* | 6/2017 | Hu ....................... H04N 21/233 |

OTHER PUBLICATIONS

Betters, Elyse, "Google+ Photos: Auto Awesome, Auto Enhance, and other photo features explored", Published on: Feb. 15, 2014, Available at: http://www.pocket-lint.com/news/127272-google-photos-auto-awesome-auto-enhance-and-other-photo-features-explored.

"Second Written Opinion Issued in PCT Application No. PCT/US2016/069057", dated Dec. 15, 2017, 6 Pages.

"International Preliminary Report on Patentability Issued in PCT Application No. PCT/US2016/069057", dated Mar. 8, 2018, 7 Pages.

"International Search Report and Written Opinion Issued in PCT Application No. PCT/US2016/069057", dated Mar. 21, 2017, 10 Pages.

* cited by examiner

GENERATING VIDEO CONTENT ITEMS USING OBJECT ASSETS

BACKGROUND

Video content items are often used to promote objects such as applications or products. For example, a company that makes a smart phone application such as a videogame may distribute a video content item that may shows various features of the videogame. The video content item can be viewed by users to determine whether they would enjoy playing the videogame.

While such video content items are effective in promoting objects, there are several drawbacks associated with the creation of video content items. First, creating video content items is expensive. Typically, creators of objects spend valuable development resources either on hiring companies to create the video content items for their objects, or on employing workers who focus on the creation of video content items. Second, creating video content items is time consuming. Because companies often require several weeks to create a video content item, the launch of an object such as an application may be delayed while the developer waits for the video content item to be completed.

SUMMARY

Video content items are automatically, or with some user input, created for objects based on assets associated with the objects. Where the object is an application, the assets may include images of the application, footage of a user using the application, and textual descriptions or reviews of the application. The assets are arranged using templates that also specify audio content to use during the video content item, as well as animations to use during the video content item. A generated video content item can be distributed with the object, or may be used to promote the object.

In an implementation, an identifier of an object is received by a computing device through a network. An identifier of a content page associated with the object is received by the computing device through the network. Assets associated with the object are extracted from the content page through the network by the computing device. A type is determined for the object based on the extracted assets by the computing device. A video content item is generated for the object based on the determined type and the extracted assets by the computing device, and the generated video content item is provided by the computing device.

In an implementation, an identifier of an object is received by a computing device through a network. Assets associated with the object are extracted from a content page associated with the object through the network by the computing device. Graphical representations of the extracted assets are presented by the computing device. An indication of selection of a subset of the extracted assets is received by the computing device. The video content item is generated from the extracted assets from the subset of the extracted assets.

In an implementation, a system includes a computing device and a video content item generation engine. The video content item generation engine is adapted to receive an identifier of an object from the computing device through a network; extract assets associated with the object from a content page associated with the object through the network; determine a type for the object based on the extracted assets; generate a video content item for the object based on the determined type and the extracted assets; and associate the generated video content item with the content page.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
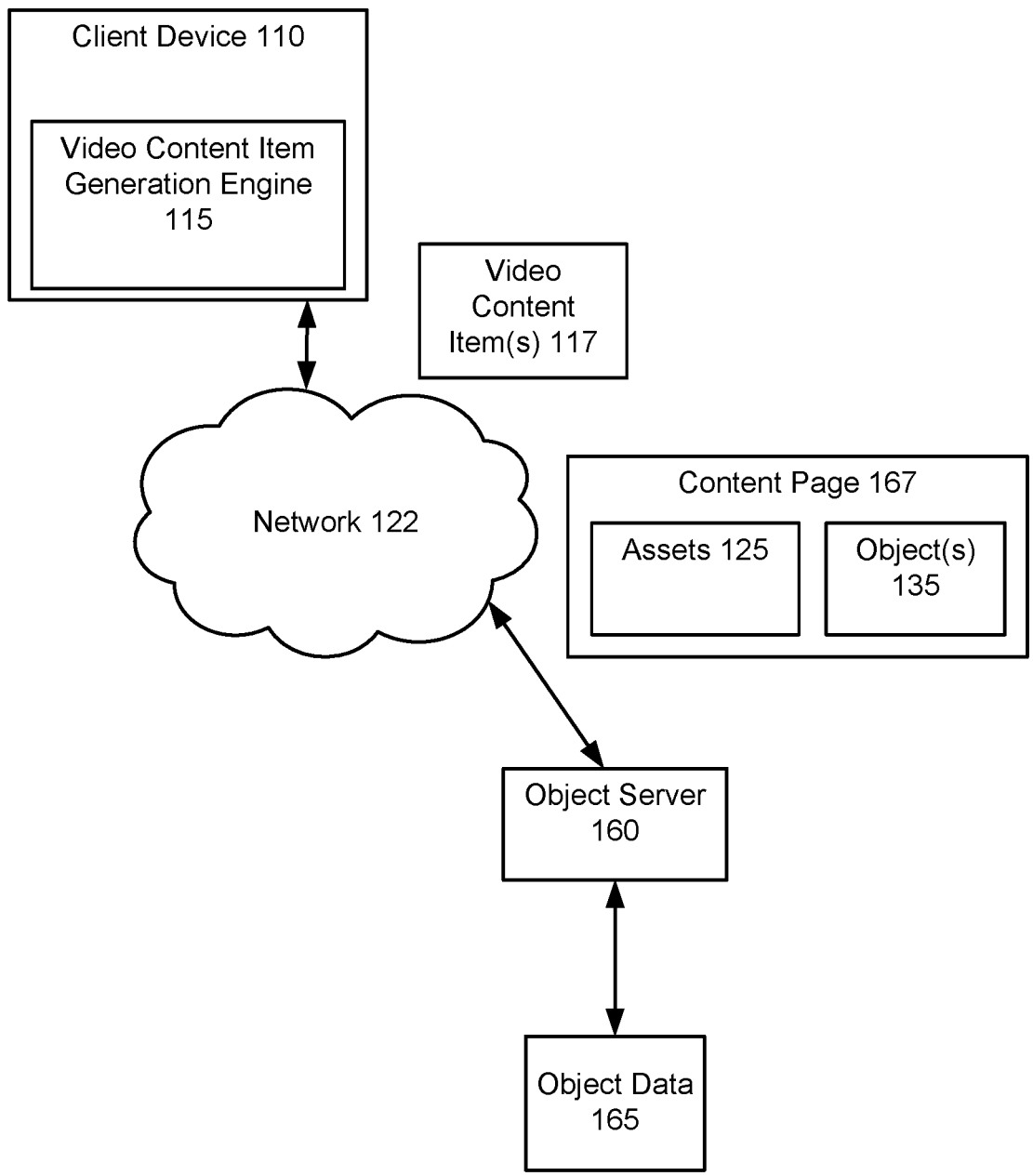
FIG. 1 is an illustration of an implementation of an exemplary environment for generating video content items for objects.

FIG. 1 is an illustration of an implementation of an exemplary environment 100 for generating one or more video content items 117 for one or more objects 135. The objects 135 may include software applications such as videogame applications and productivity applications. The objects 135 may include consumer products such as products available for sale on the Internet, etc. In some implementations, an object 135 may include any item or thing that may be represented by a content page 167 (e.g., a webpage).

The environment 100 may include an object server 160 and a client device 110 in communication through a network 122. The network 122 may be a variety of network types including the public switched telephone network (PSTN), a cellular telephone network, and a packet switched network (e.g., the Internet). Although only one object server 160 and one client device 110 are shown in FIG. 1, there is no limit to the number of object servers 160 and client devices 110 that may be supported.

Figure 10:
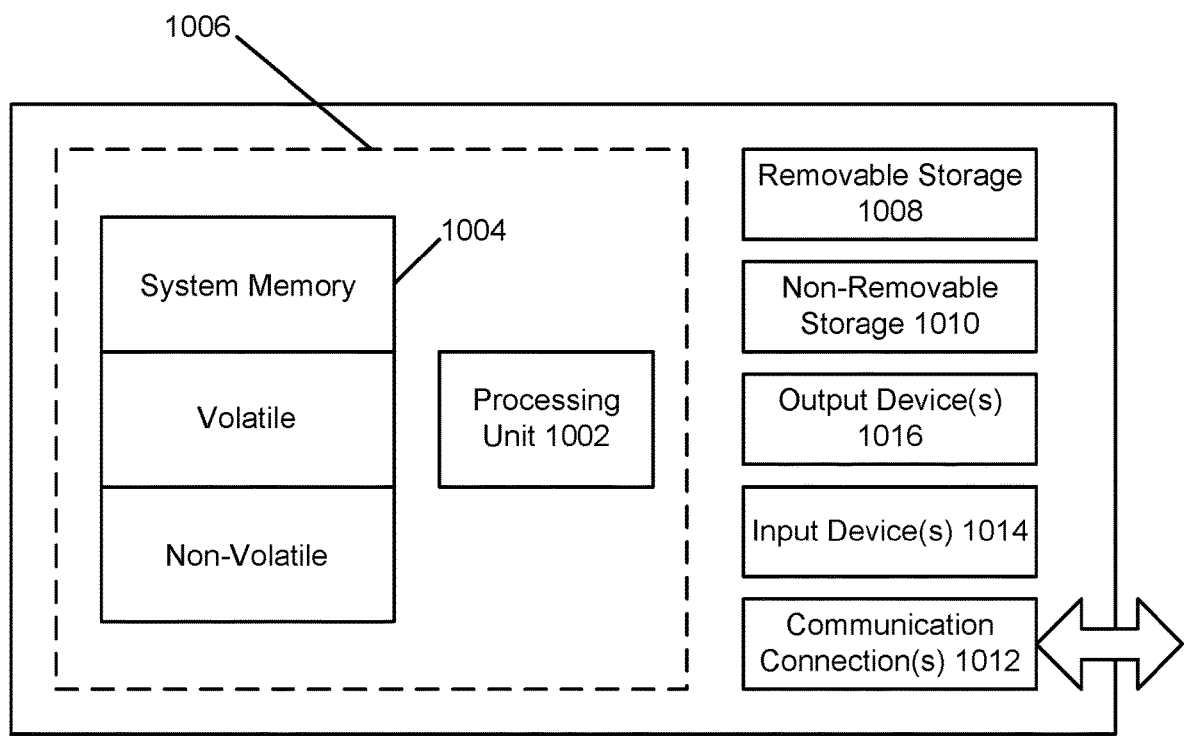
FIG. 10 shows an exemplary computing environment in which example embodiments and aspects may be implemented.

The object server 160 and the client device 110 may be implemented together or separately using a general purpose computing device such as the computing device 1000 described with respect to FIG. 10. Example computing devices include a smart phone, a tablet computer, a laptop computer, a set-top box, a personal/digital video recorder, a cloud service, or any other type of computing device.

The client device 110 may execute one or more video content item generation engines, such as the video content item generation engine 115. The video content item generation engine 115 may be an application that automatically, or semi-automatically, generates a video content item 117 for an object 135. The generated video content item 117 may be associated with the object 135, provided with the object 135, or otherwise used to promote the object 135.

The video content item generation engine 115 may generate a video content item 117 using a content page 167 associated with an object 167. The content page 167 may be provided by the object server 160 using information stored in object data 165.

Depending on the implementation, the content page 167 for an object 135 may be a webpage or other page where information about the object 135 may be viewed. For example, where the object 135 is a software application, the content page 167 may be a webpage where a user can download the software application, view images or videos of the software application, and read a description or reviews of the software application. In another example, where the object 135 is a consumer product such as a refrigerator, the content page 167 may be a webpage where a user can order the refrigerator, view images of the refrigerator, and read about features and/or specifications of the refrigerator.

The various information and media associated with an object 135 is collectively referred to herein as assets 125. Depending on the implementation, the assets 125 may include some or all of text content, image content, audio content, and video content. Other types of content may be supported. The assets 125 for an object 135 available at a content page 167 may have been provided by a user or an administrator associated with the object 135, for example.

To generate a video content item 117 for an object 135, the video content item generation engine 115 may request the content page 167 associated with the object 135 from the object server 160. In response to the request, the object server 160 may retrieve the content page 167 from the object data 165, and may provide the content page 167 to the video content item generation engine 115 through the network 122.

Figure 2:
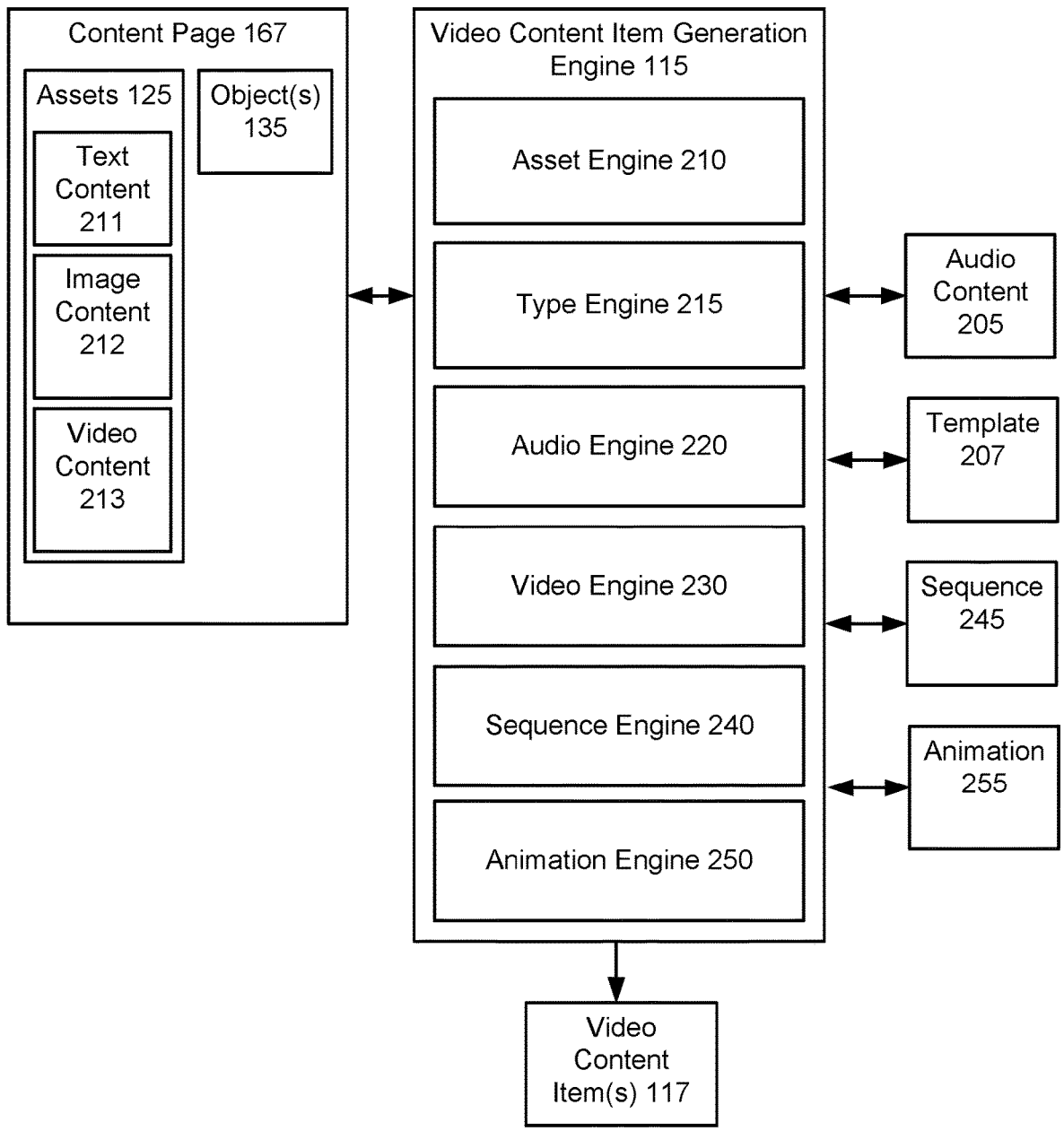
FIG. 2 is an illustration of an implementation of an exemplary video content item generation engine.

As described further with respect to FIG. 2, the video content item generation engine 115 may extract the assets 125 for an object 135 from the content page 167, and may use the extracted assets 125 to automatically generate a video content item 117. For example, where the object 135 is a videogame application, the video content item generation engine 115 may extract assets 125 such as images of the videogame, textual descriptions of the videogame, and video such as gameplay footage. The extracted assets 125 may be automatically combined together using video editing techniques such as animations and transitions to create a video content item 117. Alternatively or additionally, a user or an author may be asked to provide additional assets 125, select the assets 125 that are used to generate the video content item 117, or to select the particular animations and/or transitions that are used to generate the video content item 117.

Once generated, the video content item 117 may be used to promote the object 135. For example, the video content item 117 may be added to the content page 167 associated with the object 135, or may be distributed to users who may be interested in the object 135 through the network 122. Where the object 135 is a videogame or other application, the generated video content item 117 may be made available in an application store where users are able to peruse and download applications. The video content item 117 may also be distributed with, and shown during, different applications, to entice users to download the application associated with the video content item 117.

As may be appreciated, generating video content items 117 by the video content item generation engine 115 may provide several advantages. Because the video content item 117 is generated for the user, no video or image editing skills or knowledge of any particular image or video editing applications are necessary to create the video content item 117. In addition, because existing assets 125 are used to generate the video content item 117, no additional costs may be incurred in the creation of the video content item 117 outside of any costs associated with the creation of the assets 125 for the content page 167.

FIG. 2 is an illustration of an implementation of an exemplary video content item generation engine 115. The video content item generation engine 115 may include one or more components including an asset engine 210, a type engine 215, an audio engine 220, a video engine 230, a sequence engine 240, and an animation engine 250. Some or all of the components of the video content item generation engine 115 may be implemented by one or more computing devices such as the computing device 1000 described with respect to FIG. 10.

The asset engine 210 may retrieve assets 125 for an object 135. Depending on the implementation, when a user initiates the creation of a video content item 117 using the video content item generation engine 115, the user may enter a URL, or other address, of the content page 167 associated with the object 135. The asset engine 210 may retrieve the content page 167 using the provided URL and extract the assets 125 from the retrieved content page 167. Any method or technique for extracting assets 125 from a content page 167 may be used.

Depending on the implementation, the extracted assets 125 may include text content 211, image content 212, and video content 213. The text content 211 may include text (e.g., words, sentences, and paragraphs) about the object 135. Examples of text content 211 may include descriptions of the object 135 and reviews of the object 135. Other types of text content 211 may be supported.

The text content 211 may include any text extracted from the content page 167. In addition, the text content 211 may include text extracted from other content pages or webpages that are linked to by the content page 167. For example, the content page 167 may include links to websites that include reviews or more detailed descriptions of the object 135. Text from the linked websites may be included in the text content 211 by the asset engine 210.

The image content 212 may include images or other graphical information that may be part of the content page 167. The image content items 212 may include gifs, jpegs, tiffs, or any other format that may be used to represent images.

In some implementations, the asset engine 210 may determine the image content 212 by extracting all of the images from the content page 167. Alternatively, the asset engine 210 may extract images only from certain regions or areas of the content page 167. For example, the asset engine 210 may not extract images from areas of the content page 167 that may be associated with advertisements.

In addition, the asset engine 210 may consider metadata such as tags that may be associated with the images in the content page 167. Metadata or tags associated with each image in the content page 167 may indicate to the asset engine 210 that the image is an asset 125 that may be useful in the creation of the video content item 117.

For example, images on content pages 167 associated with objects 135 that are applications, may include tags that indicate what each image represents. Examples include "start screen" for images of the title screen or beginning of the application, "gameplay screen" for images of gameplay from the application, and "in app purchases" for images of a user making purchases using the application. In some implementations, the particular tags associated with each image may be specified by an administrator associated with the object server 160, for example.

The video content 213 may be videos that may be part of, or embedded in, the content page 167. The video content 213 may include videos of the associated object 135. For example, where the object 135 is a house, the video content 213 may be a video of the interior and exterior of the house. Where the object 135 is a software application, the video content 213 may be footage of the application being executed. Similar to the image content 212, the asset engine 210 may locate the video content 213 in the content page 167 by searching for embedded video content 213 in the content page 167, or based on tags or metadata that identifies the video content 213 in the content page 167.

The type engine 215 may determine a type for the object 135. The type may describe the object 135 and may be used to determine how to generate the video content item 117. Depending on the implementation, the type engine 215 may determine the type by prompting a user of the client device 110 to identify the type. Alternatively, the type may be determined automatically by parsing the text content 211 of the content page 167 for one or more keywords that may identify the type of the object 135. For example, where the object 135 is a software application such as a videogame, the type engine 215 may parse the text content 211 for keywords that are associated with videogames or a particular genre of videogames.

In some implementations, the type engine 215 may determine the type for the object 135 by looking for a particular heading, tag, or other metadata that identifies the type of the object 135. For example, a content page 167 associated with an object 135 that is a videogame may have a heading that indicates the genre of the videogame to users, such as driving game, fighting game, action game, etc.

The type engine 215 may select a template 207 based on the determined type. A template 207 may be a file or other document that controls how the video content item 117 is generated. For example, the template 207 may include the length, resolution, aspect ratio, and file format that may be used to create the video content item 117.

The template 207 may further control how the assets 125 may be used to generate a video content item 117. For example, the template 207 may indicate when, where, and for how long the text content 211, image content 212, and video content 213 is displayed in the video content item 117. The template 207 may further control the particular animations that are used in the video content item 117, for example.

Each type of object 135 may be associated with a different template 207. As may be appreciated, some types of objects 135 may be better suited to different styles of video content items 117. For example, for an object 135 that is an action videogame, quick transitions and animations may be appropriate for the video content item 117. For an object 135 that is a puzzle game, more conservative transitions and animations may be appropriate for the video content item 117. The templates 207 may be generated for each type of object 135 by an administrator, for example.

The audio engine 220 may select audio content 205 (e.g., music and sound effects) that may be used for the video content item 117. In implementations where the video content item 117 is automatically generated, the audio engine 220 may select audio content 205 that is specified in the template 207 that is associated with the determined type of the object 135.

In implementations where a user is more involved in the creation of the video content item 117, the audio engine 220 may prompt the user to select the audio content 205. For example, the user may be asked to select from a plurality of songs and tracks that are associated with the determined type. Alternatively or additionally, the user may select audio content 205 that is not associated with the determined type, or the user may upload or otherwise provide their own audio content 205 to the audio engine 220.

The video engine 230 may edit or generate video content 213 for the video content item 117. In implementations where the extracted assets 125 included video content 213, the video content engine 230 may automatically edit the video content 213. For example, where the object 135 is an application, and the video content 213 is footage demonstrating the application, the video engine 230 may automatically edit the video content 213 by taking the first five, ten, or fifteen seconds of the video content 213.

Alternatively, the video content engine 230 may allow a user to edit the video content 213. For example, the video content engine 230 may generate an interface on the client device 110 through which the user may edit the video content 213 by selecting and/or cutting portions of the video content 213. Any method or technique for editing video content 213 may be used.

Where no video content 213 is extracted as part of the assets 125 of the content page 167, the video engine 230 may prompt the user of the client device 110 to provide or upload their own video content 213. Where the objects 135 is an application, the video engine 230 may allow the user to execute the application in an operating system emulator or other computer environment, and the video content engine 230 may record the user interacting with the application as the video content 213. The user may edit the generated video content 213 as described above.

The sequence engine 240 may generate a sequence 245 of various assets 125 for the video content item 117. Depending on the implementation, the assets 125 may be ordered in the sequence 245 based on the template 207 associated with the determined type of the object 135. For example, the template 207 may specify that text from the text content 211 be shown, followed by an image from the image content 212, followed by video from the video content 213, for example.

In implementations where a user directs the creation of the video content item 117, the user may adjust the sequence 245 of the assets 125. For example, the sequence engine 240 may generate an interface through which the user may change the order of the images, text, or other assets 125 in the sequence 245.

The user may add or remove assets 125 from the generated sequence 245. For example, the user may remove images from the image content 212 that are part of the sequence 245, or may add text to the sequence 245 that was not part of the text content 211 that was extracted by the asset engine 210.

The animation engine 250 may select one or more animations 255 for the assets 125 in the generated sequence 245. Depending on the implementation, the animations 255 may be selected by the animation engine 250 based on the template 207 associated with the determined type. The selected animations 255 may be used for each displayed asset 125 in the generated sequence 245, and for transitions between the assets 125 in the sequence 245. For example, an asset 125 such as text content 211 may be displayed using an animation 255 that makes the text content 211 appear to slowly get larger. The text content 211 may be replaced by image content 212 using an animation such as a swipe. Other types of animations 255 may be used.

In implementations where a user directs the creation of the video content item 117, the user may adjust the animations 255 that are selected for each asset 125 in the generated sequence 245. For example, the animation engine 250 may generate an interface through which the user may change the proposed animations 255, or adjust various settings associated with some or all of the animations 255 such as speed and duration. Any type of animations 255 used for video production may be used.

The video content item generation engine 115 may generate the video content item 117 based on the extracted assets 125, the selected audio content 205, the generated sequence 245, and the selected animations 255. The video content item 117 may be published on the content page 167 associated with the object 135, or may otherwise be used to promote the object 135.

In implementations where the object 135 is a smart phone or tablet application, the video content item 117 may be distributed along with a related smart phone or tablet application. When a user uses the related smart phone application, the video content item 117 may be played for the user to entice the user to download or purchase the application shown in the video content item 117.

Figure 3:
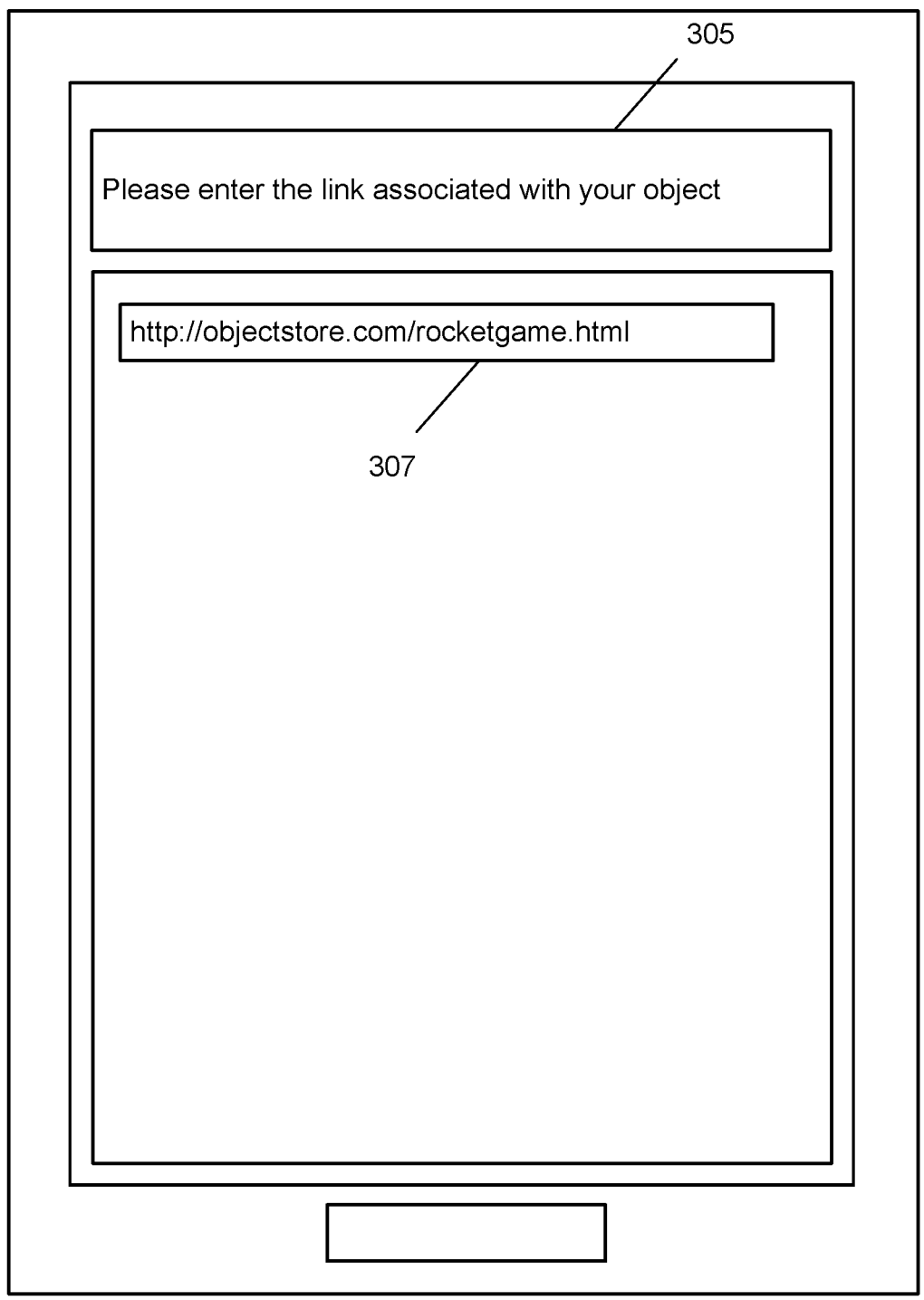
FIG. 3 is an illustration of an exemplary user interface for generating video content items.

FIG. 3 is an illustration of an exemplary user interface 300 for generating video content items 117. As shown, the user interface 300 may be implemented on a client device 110 such a smart phone or a tablet computer. Other types of client devices 110 may be supported.

The user interface 300 may be used to generate a video content item 117 for an object 135 such as a smart phone application for a smart phone or tablet. A window 305 of the user interface 300 instructs the user to enter a link or reference to a content page 167 associated with the object 135 that they would like to generate a video content item 117 for. In the example shown, a user has submitted the URL "http://objectstore.com/rocketgame.html" in a user interface element 307 for a smart phone game titled "Rocket Game." The URL may be a link to an online store or object server 160 where the game can be downloaded.

Figure 4:
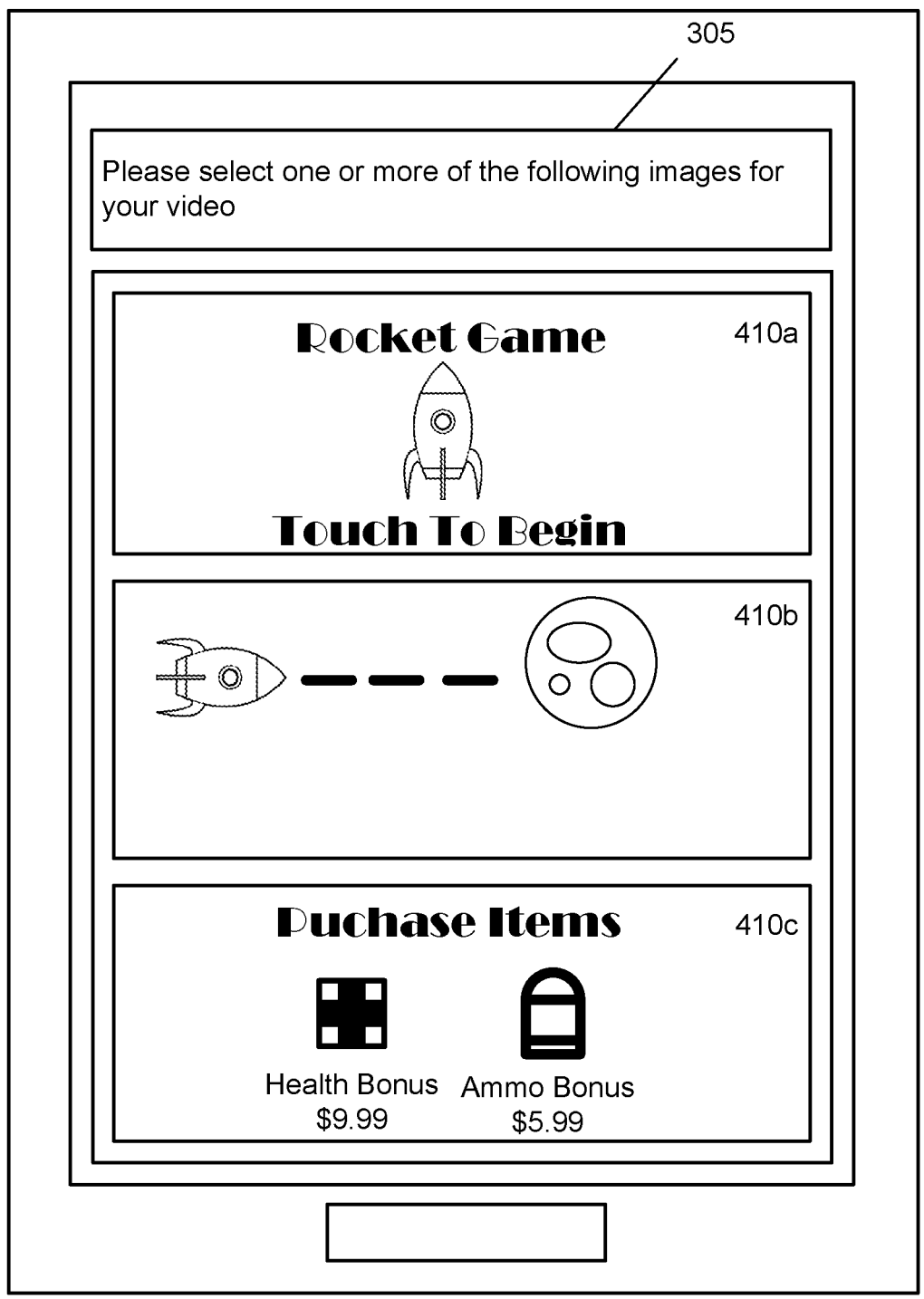
FIG. 4 is an illustration of an exemplary user interface for generating video content items.

In response to the submission, the asset engine 210 of the video content item generation engine 115 may retrieve assets 125 for the object 135 from the content page 167 corresponding to the URL. Continuing to FIG. 4, the asset engine 210 has retrieved image content 212 that includes three images 410a, 410b, and 410c, and has displayed the images 410a-c to the user in the user interface 300. The images 410a-c are gameplay images taken of the object 135. The window 305 now instructs the user to select one or more of the images 410a-c to use in the generated video content item 117. The user may select or touch one or more of the images 410a-c using a touch interface provided by the client device 110.

Figure 5:
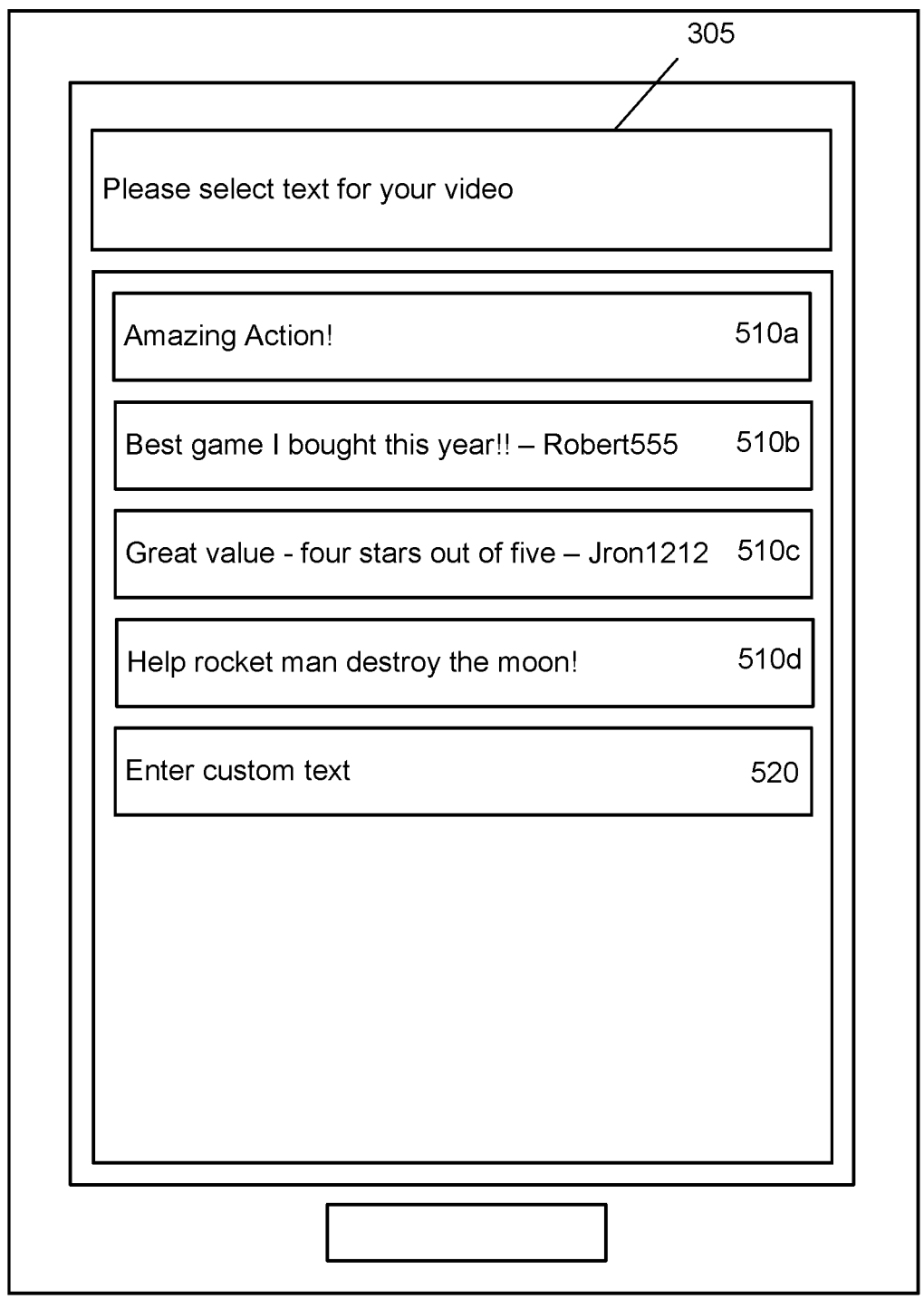
FIG. 5 is an illustration of an exemplary user interface for generating video content items.

After the user selects the desired images from the images 410a-c, the asset engine 210 may display text content 211 of the retrieved assets 125 from the content page 167. Continuing to FIG. 5, the asset engine 210 has displayed graphical representations 510a, 510b, 510c, and 510d each with a different selection of text from the text content 211 extracted from the content page 167. The user interface 300 also includes a user interface element 520 through which the user may enter custom text of their choice. The window 305 has been updated to instruct the user to select text for the video content item 117. The user may select or touch one or more of the graphical representations 510a-d using the touch interface provided by the client device 110, and/or may use the touch interface to enter text into the user interface element 520.

Figure 6:
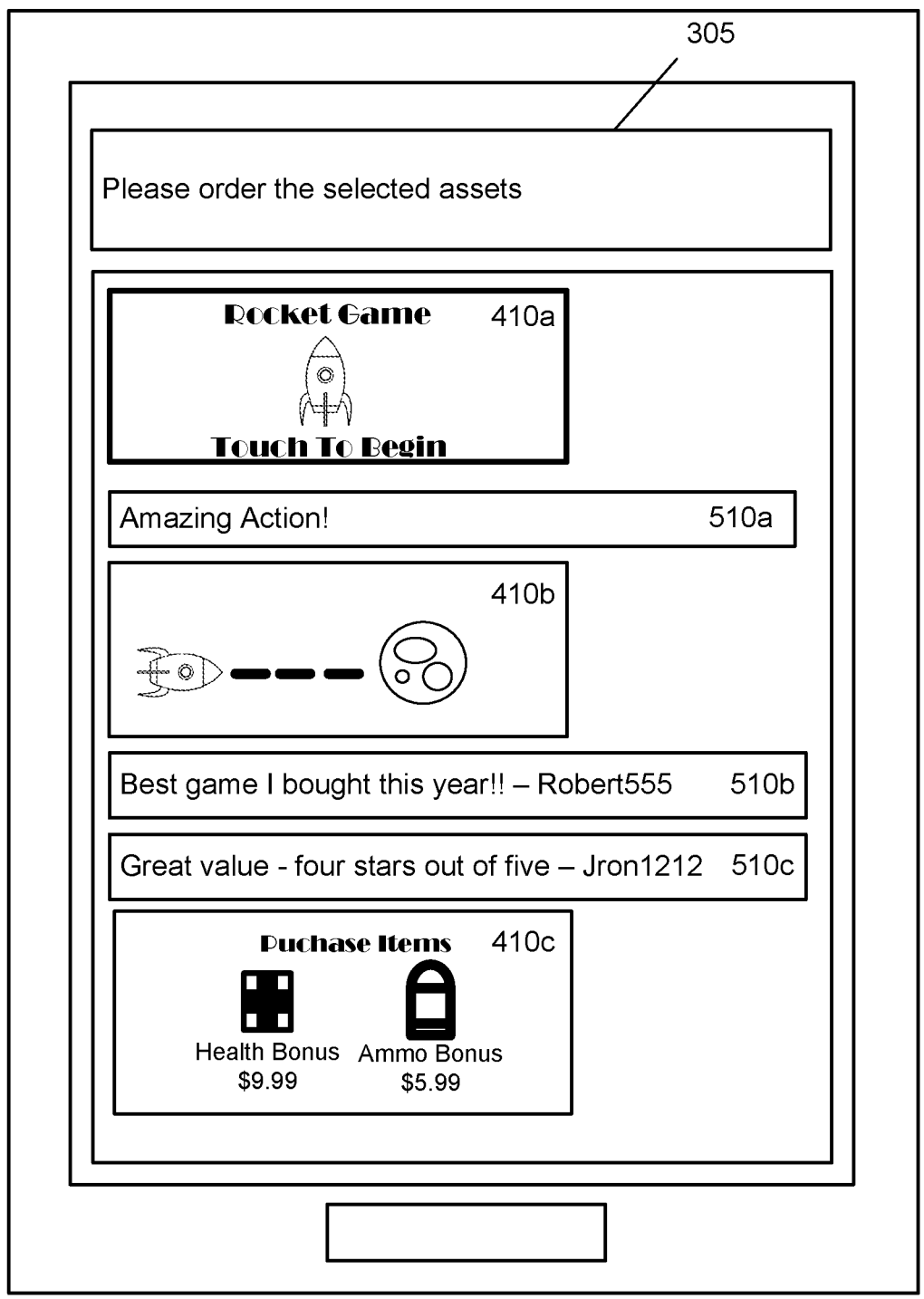
FIG. 6 is an illustration of an exemplary user interface for generating video content items.

Continuing to FIG. 6, the user interface 300 has been updated to reflect the various assets 125 that the user has selected for the sequence 245. As shown, the user has selected the image content 212 corresponding to the images 410a, 410b, and 410c, and the text content 211 corresponding to the graphical representations 510a, 510b, and 510c.

The window 305 now instructs the user to order the selected assets 125. Initially, the assets 125 may be displayed in a sequence 245 that is determined based on a template 207 corresponding to the type of the object 135. However, the user may use the touch interface provided by the client device 110 to reorder the various assets 125 shown in the user interface 300.

In addition, the user may select or change the various animations 255 that may be associated with the various assets 125 of the sequence 245 shown in the user interface 300. In the example shown, the user has used the touch interface of the client device 110 to indicate that the user would like to change the animation 245 associated with the image 410a. The user may make the indication using a particular gesture or other type of indication that is recognized by the touch interface.

Figure 7:
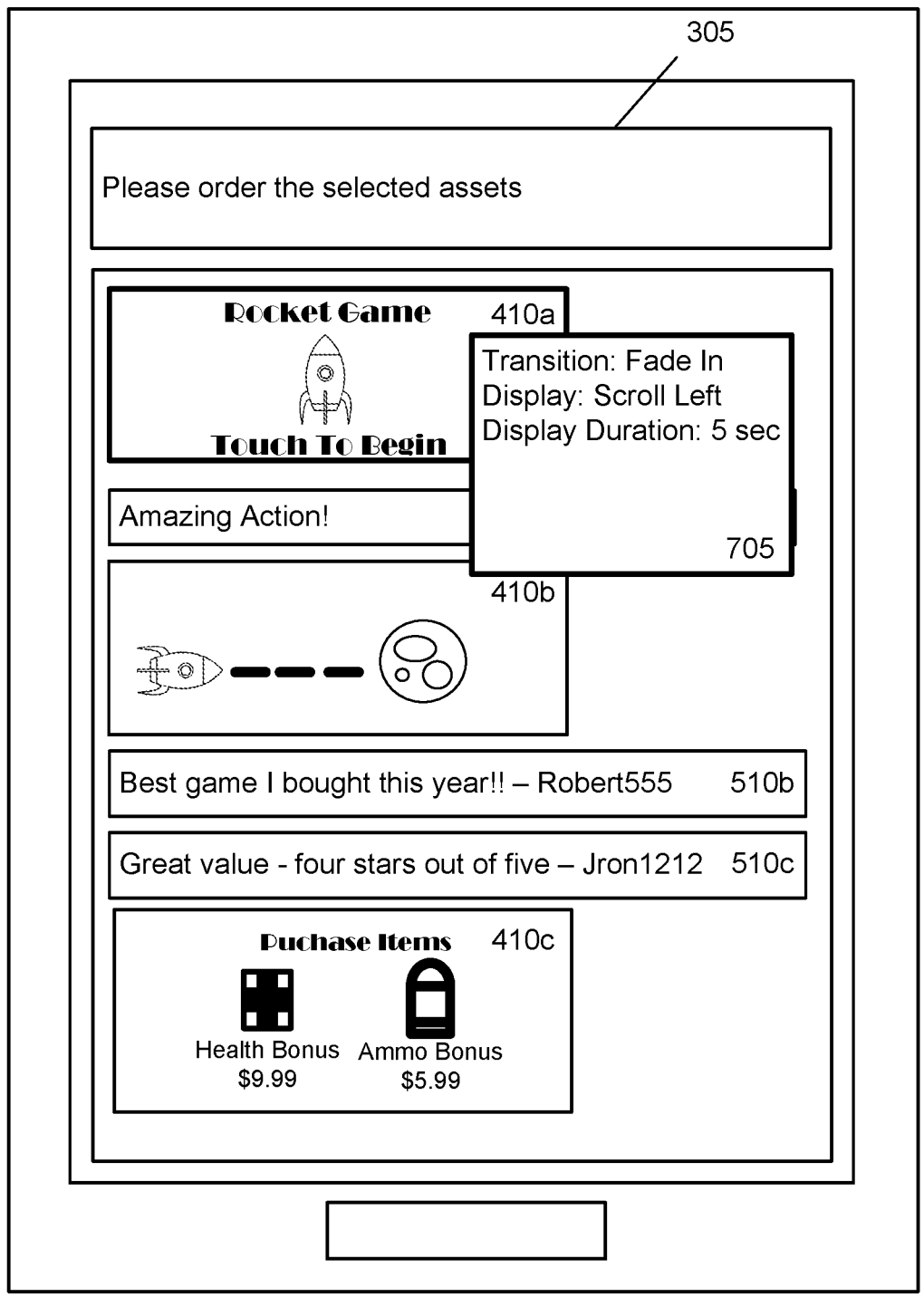
FIG. 7 is an illustration of an exemplary user interface for generating video content items.

Continuing to FIG. 7, in response to the gesture, the user interface 300 has displayed a window 705 that shows the various animations 255 that are currently associated with the image 410a. In the example shown, the animations 255 associated with the image 410a include "Fade In" and "Scroll Left". In addition, the window 705 indicates that the image 410a is scheduled to be displayed in the video content item 117 for five seconds. The user may change any of the animations 255 and/or display time in the window 705 using the touch interface of the client device 110. After the user accepts all of the displayed assets 125, sequence 245, and animations 255, the video content item generator engine 115 may generate the video content item 117 in the user interface 300 for viewing and approval by the user.

Figure 8:
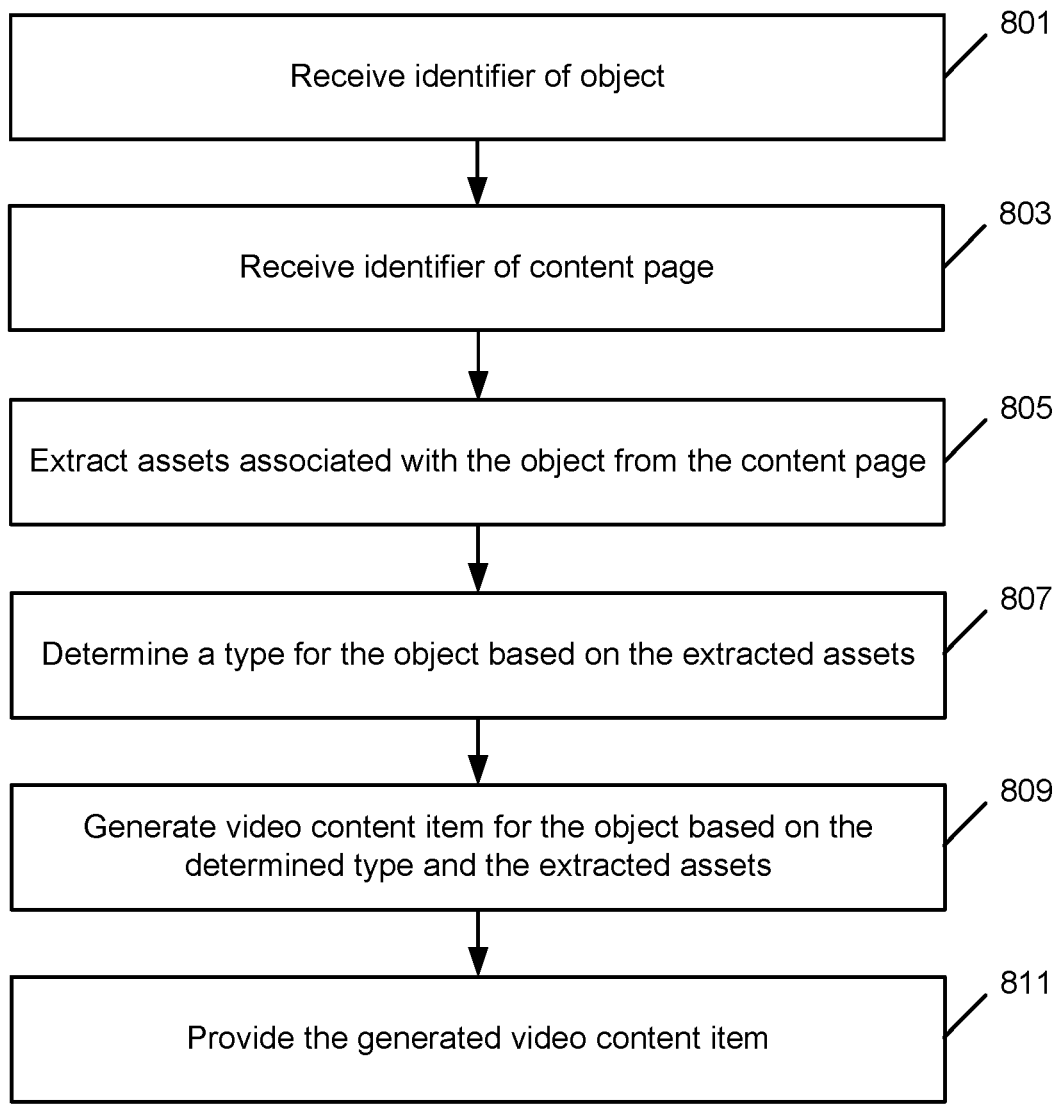
FIG. 8 is an operational flow of an implementation of a method for generating a video content item for an object.

FIG. 8 is an operational flow of an implementation of a method 800 for generating a video content item for an object. The method 800 may be implemented by the video content item generation engine 115.

At 801, an identifier of an object is received. The identifier of an object 135 may be received by the video content item generation engine 115. Depending on the implementation, the video content item generation engine 115 may be executed by a client device 110 and may receive the identifier directly from the client device 110. Alternatively, the video content item generation engine 115 may be external to the client device 110 and may receive the identifier from the client device 110 through a network. The identified object 135 may be an application. Other types of objects 135 may be supported.

At 803, an identifier of a content page is received. The identifier of a content page 167 may be received by the video content item generation engine 115 from the client device 110. The content page 167 may be a webpage or other type of document that includes information about the object 135, such as assets 125. The content page 167 may be made available by an object server 160. In some implementations, the object server 160 may be an application store, and the content page 167 may be a webpage through which a user can download the object 135.

At 805, assets associated with the object are extracted from the content page. The assets 125 may be extracted from the content page 167 by the asset engine 210. The extracted assets 125 may include some or all of the text content 211, the image content 212, and the video content 213. Other types of assets 125 may be supported.

At 807, a type for the object is determined based on the extracted assets. The type may be determined by the type engine 215. In some implementations, the type may be determined by the type engine 215 based on metadata or tags associated with the content page 167 that describe the type of the object 135. Alternatively or additionally, the type engine 215 may determine the type by processing the text content 211 looking for words or phrases that are indicative of the type of the object 135. For example, where the object 135 is a software application, the type engine 215 may determine that the type of the software application is "puzzle game" based on words and phrases associated with puzzle games in the text content 211.

At 809, a video content item is generated for the object based on the determined type and the extracted assets. The video content item 117 may be generated by the video content item generation engine 115 using a template 207 corresponding to the determined type and some of all of the assets 125. Depending on the implementation, the template 207 may identify audio content 205 to use in the video content item 117, animations 255 to use for the assets 125 in the video content item 117, as well as a sequence 245 or order for the assets 125 in the video content item 117.

At 811, the generated video content item is provided. The generate video content item 117 may be provided by the video content item generation engine 115 to the client device 110. Depending on the implementation, the video content item 117 may be used to promote the object 135. For example, the video content item 117 may be associated with the content page 167, by adding a link to the video content item 117 to the content page 167.

Figure 9:
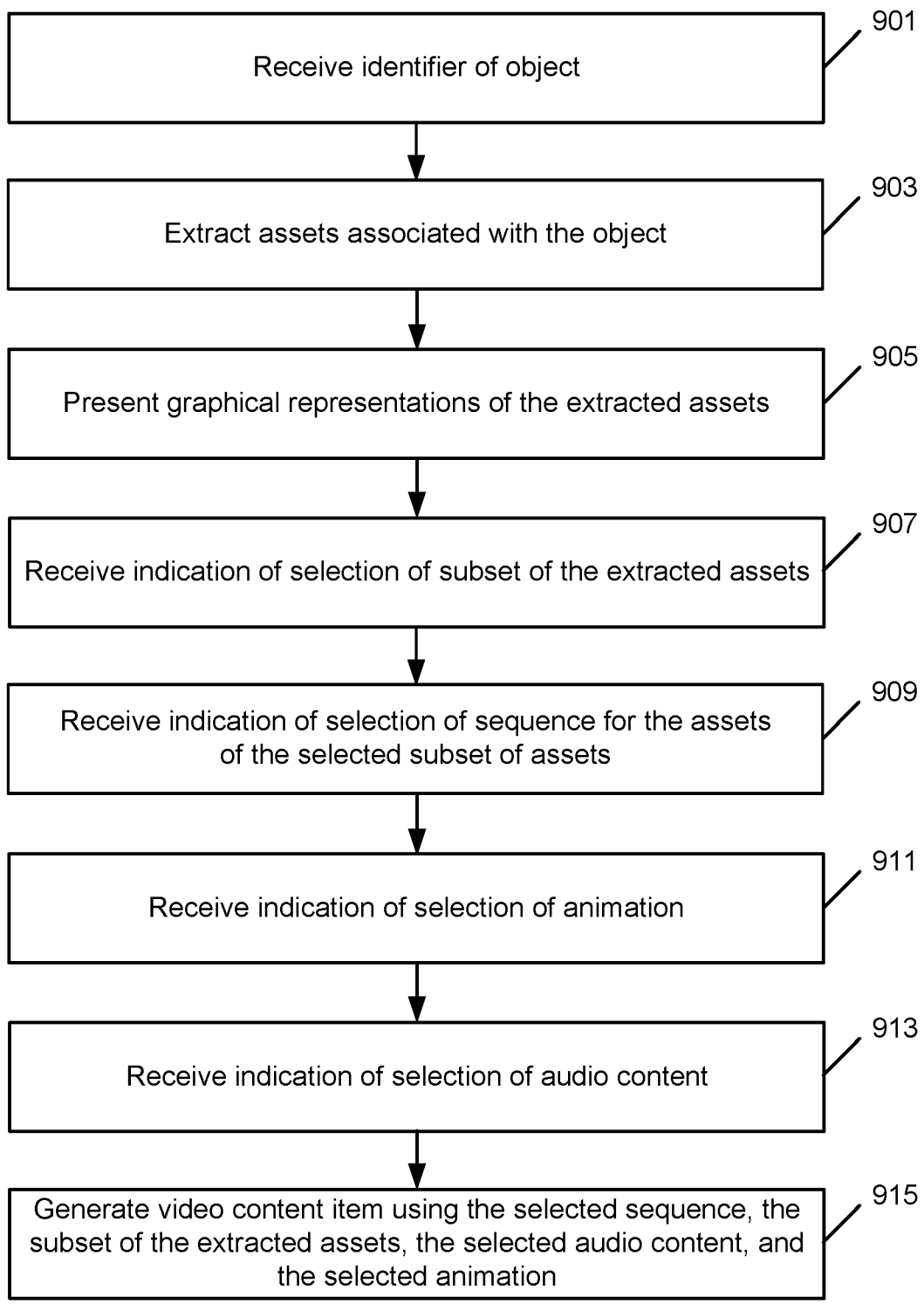
FIG. 9 is an operational flow of another implementation of a method for generating a video content item for an object.

FIG. 9 is an operational flow of an implementation of a method 900 for generating a video content item for an object. The method 900 may be implemented by the video content item generation engine 115.

At 901, an identifier of an object is received. The identifier of an object 135 may be received by the video content item generation engine 115 from the client device 110.

At 903, assets associated with the object are extracted. The assets 125 associated with the object 135 may be extracted from a content page 167 associated with the object 135 by the asset engine 210. The extracted assets 125 may include text content 211, image content 212, and video content 213.

At 905, graphical representations of the extracted assets are presented. The graphical representations of the extracted assets 125 may be displayed by the video content item generation engine 115 on a display associated with the client device 110. In some implementations, the graphical representations may be displayed such that the user can select which assets 125 to include in the generated video content item 117. The video content item generation engine 115 may generate graphical representations of some or all of the text content 211, the image content 212, and the video content 213 of the assets 125, for example.

At 907, an indication of selection of a subset of the extracted assets is received. The indication of selection may be received by the video content item generation engine 115. For example, a user may use a touch interface associated with the display of the client device 110 to select the displayed graphical representations of the subset of the extracted assets 125, and in response to the selection, the touch interface may generate and provide an indication of selection of the assets 125 in the subset to the video content item generation engine 115.

At 909, an indication of selection of a sequence for the assets of the subset of assets is received. The indication of selection of a sequence 245 may be received by the video content item generation engine 115. Depending on the implementation, a user may order the graphical representations of the assets in the subset of assets in a sequence 245 that the user would like the assets to appear in the generated video content item 117. Initially, the assets may appear in a sequence 245 that is based on a template 207, for example.

At 911, an indication of selection of an animation is received. The indication of selection of an animation 255 may be received by the video content item generation engine 115. The user may select an animation 255 for one or more of the assets in the subset of assets. Similar to the sequence 245, initially each asset may be associated with an animation 255 that was selected by the animation engine 250 based on the template 207.

At 913, an indication of selection of audio content is received. The indication of selection of audio content 205 may be received by the video content item generation engine 115. The user may select audio content 205 to play during the generated video content item 117. Depending on the implementation, the audio content 205 may be initially selected by the audio engine 220 based on the template 207.

At 915, a video content item is generated using the selected sequence, the subset of the extracted assets, the selected audio content, and the selected animations. The video content item 117 may be generated by the video content item generation engine 115. Depending on the implementation, the generated video content item 117 may be used to promote the object 135, or may otherwise be associated with the object 135.

FIG. 10 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 10, an exemplary system for implementing aspects described herein includes a computing device, such as computing device 1000. In its most basic configuration, computing device 1000 typically includes at least one processing unit 1002 and memory 1004. Depending on the exact configuration and type of computing device, memory 1004 may be volatile (such as random access memory (RAM)), non-volatile (such as read-only memory (ROM), flash memory, etc.), or some combination of the two. This most basic configuration is illustrated in FIG. 10 by dashed line 1006.

Computing device 1000 may have additional features/functionality. For example, computing device 1000 may include additional storage (removable and/or non-removable) including, but not limited to, magnetic or optical disks or tape. Such additional storage is illustrated in FIG. 10 by removable storage 1008 and non-removable storage 1010.

Computing device 1000 typically includes a variety of computer readable media. Computer readable media can be any available media that can be accessed by the device 1000 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1004, removable storage 1008, and non-removable storage 1010 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of computing device 1000.

Computing device 1000 may contain communication connection(s) 1012 that allow the device to communicate with other devices. Computing device 1000 may also have input device(s) 1014 such as a keyboard, mouse, pen, voice input device, touch input device, etc. Output device(s) 1016 such as a display, speakers, printer, etc. may also be included. All these devices are well known in the art and need not be discussed at length here.

In an implementation, a system for automatically generating a video content item for an object based on assets associated with the object is provided. The system includes a computing device and a video content item generation engine. The video content item generation engine is adapted to receive an identifier of an object from the computing device through a network; extract assets associated with the object from a content page associated with the object through the network; determine a type for the object based on the extracted assets; generate a video content item for the object based on the determined type and the extracted assets; and associate the generated video content item with the content page.

Implementations may include some or all of the following features. The object may be an application. The extracted assets may include text content and image content. The video content item generation engine adapted to determine the type for the object based on the extracted assets may include the video content item generation engine adapted to determine the type for the object based on the text content. The video content item generation engine adapted to generate the video content item for the object based on the determined type and the extracted assets may include the video content item generation engine adapted to: select audio content based on the determined type; select one or more images from the image content of the extracted assets; select text from the text content of the extracted assets; generate a sequence for the selected one or more images and the selected text based on the determined type; select one or more animations for the generated sequence based on the determined type; and generate the video content item based on the selected audio content, the selected one or more images, the selected one or more animations, and the generated sequence. The video content item generation engine adapted to generate the video content item for the object based on the determined type and the extracted assets may include the video content item generation engine adapted to: select audio content based on the determined type; generate video content for the object using an operating system emulator and the object; and generate the video content item based on the selected audio content and the generated video content.

In an implementation, a method for generating a video content item for an object based on assets associated with the object is provided. The method includes receiving an identifier of an object by a computing device through a network; extracting assets associated with the object from a content page associated with the object through the network by the computing device; presenting graphical representations of the extracted assets by the computing device; receiving an indication of selection of a subset of the extracted assets by the computing device; and generating the video content item from the extracted assets from the subset of the extracted assets.

Implementations may include some or all of the following features. The method may further include presenting graphical representations of audio content, receiving an indication of selection of one of the graphical representations of the audio content, and generating the video content item from the extracted assets from the subset of the extracted assets and the audio content corresponding to the selected one of the graphical representations of the audio content. The object may be an application. The extracted assets may include one or more of text content, image content, and video content. The method may further include receiving an indications of selection of an animation; and generating the video content item from the extracted assets from the subset of the extracted assets and the selected animation. The method may further include receiving an indication of selection of a sequence for the assets of the subset of extracted assets; and generating the first video content item from the extracted assets from the subset of the extracted assets according to the selected sequence.

In an implementation, a method for automatically generating a video content item for an object based on assets associated with the object is provided. The method includes receiving an identifier of an object by a computing device through a network; receiving an identifier of a content page associated with the object by the computing device through the network; extracting assets associated with the object from the content page through the network by the computing device; determining a type for the object based on the extracted assets by the computing device; generating a video content item for the object based on the determined type and the extracted assets by the computing device; and providing the generated video content item by the computing device.

Implementations may include some or all of the following features. The object may be an application. The extracted assets may include text content, image content, and video content. Determining the type for the object based on the extracted assets may include determining the type for the object based on the text content. Generating the video content item for the object based on the determined type and the extracted assets may include: selecting audio content based on the determined type; selecting one or more images from the image content of the extracted assets; selecting text from the text content of the extracted assets; generating a sequence for the selected one or more images and the selected text based on the determined type; selecting one or more animations for the generated sequence based on the determined type; and generating the video content item based on the selected audio content, the selected one or more images, the selected one or more animations, and the generated sequence. The method may include associating the video content item with the content page. Associating the video content item with the content page may include adding a link to the video content item to the content page.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for automatically generating a video content item for an object based on assets associated with the object, the system comprising:
a computing device adapted to:
extract assets associated with an object comprising an application from a content page associated with the application through a network, wherein the content page is a publicly available webpage from which the application can be downloaded and wherein the extracted assets comprise video content of the application, text content and image content;
determine a type for the application based on the extracted assets by parsing text content of the content page for at least one keyword that identifies the type of the application;
select audio content based on the determined type;
select one or more images from the image content of the extracted assets;
select text from the text content of the extracted assets;
generate a sequence for the selected one or more images and the selected text based on the determined type;
select one or more animations for the generated sequence based on the determined type; and
generate a video content item for the application automatically using a template that controls how the video content item is generated based on the determined type of the application and using the selected audio content, the selected one or more images, the selected one or more animations, and the generated sequence, wherein the video content item promotes the application; and
associate the generated video content item with the content page; and
a memory for storing the generated video content item.

2. The system of claim 1, wherein the computing device is further adapted to determine the type for the application based on the text content.

3. The system of claim 1, wherein the computing device is further adapted to:
select audio content based on the determined type;
generate video content for the application using an operating system emulator and the application; and
generate the video content item using the selected audio content and the generated video content.

4. The system of claim 1, wherein the computing device is further adapted to add a link to the video content item to the content page.

5. A method for generating a video content item for an object based on assets associated with the object, comprising:
extracting assets associated with an object comprising an application from a content page associated with the application through a network by a computing device, wherein the content page is a webpage where the application may be ordered and wherein the extracted assets comprise video content of the application;
determining a type for the application based on the extracted assets by parsing text content of the content page for at least one keyword that identifies the type of the application by the computing device;
presenting graphical representations of the extracted assets by the computing device;
presenting graphical representations of audio content;
receiving an indication of selection of a subset of the extracted assets by the computing device;
receiving an indication of selection of one of the graphical representations of the audio content; and
generating a video content item automatically using a template that controls how the video content item is generated based on the determined type of the application and using the extracted assets from the subset of the extracted assets and the audio content corresponding to the selected one of the graphical representations of the audio content, wherein the video content item promotes the application.

6. The method of claim 5, wherein the extracted assets comprise one or more of the text content, image content, and the video content.

7. The method of claim 5, further comprising:
receiving an indication of selection of an animation; and
generating the video content item from the extracted assets from the subset of the extracted assets and the selected animation.

8. The method of claim 5, further comprising:
receiving an indication of selection of a sequence for the assets of the subset of extracted assets; and
generating the first video content item from the extracted assets from the subset of the extracted assets according to the selected sequence.

9. A method for automatically generating a video content item for an object based on assets associated with the object, comprising:
extracting assets associated with an object comprising an application from a content page through a network by a computing device, wherein the content page is a webpage where a user can view and download the application and wherein the extracted assets comprise video content of the application, text content, and image content;

determining a type for the application based on the extracted assets by parsing text content of the content page for at least one keyword that identifies the type of the application by the computing device;

selecting audio content based on the determined type;

selecting one or more images from the image content of the extracted assets;

selecting text from the text content of the extracted assets;

generating a sequence for the selected one or more images and the selected text based on the determined type;

selecting one or more animations for the generated sequence based on the determined type;

generating a video content item for the application automatically using a template that controls how the video content item is generated based on the determined type of the application and using the selected audio content, the selected one or more images, the selected one or more animations, and the generated sequence by the computing device, wherein the video content item promotes the application; and providing the generated video content item by the computing device.

10. The method of claim 9, wherein determining the type for the application based on the extracted assets comprises determining the type for the application based on the text content.

11. The method of claim 9, further comprising associating the video content item with the content page.

12. The method of claim 11, wherein associating the video content item with the content page comprises adding a link to the video content item to the content page.

* * * * *